United States Patent Office 3,281,389
Patented Oct. 25, 1966

3,281,389
PROCESSING OF CIS POLYBUTADIENE RUBBER BY COMPOUNDING WITH LIQUID POLYBUTADIENES
Stanley M. Hirshfield, Trenton, N.J., assignor to Columbian Carbon Company, New York, N.Y., a corporation of Delaware
No Drawing. Filed Dec. 12, 1962, Ser. No. 244,027
12 Claims. (Cl. 260—33.6)

This invention relates to synthetic rubber compositions and the compounding thereof and particularly to the compounding of cis-polybutadiene rubber and blends of cis-polybutadiene rubber with other rubbers. More specifically the invention relates to improved vulcanizable cis-polybutadiene rubber compositions characterized by excellent processing properties and highly desirable physical properties upon vulcanization, and to a method of producing same.

Sulfur vulcanizable butadiene polymers characterized by a cis-1,4-configuration of at least 85 percent, desirably over 90 percent, and hereinafter called "cis-polybutadiene rubber" may be produced by numerous methods well known in the art. One method, for example, comprises polymerizing butadiene in the presence of a catalyst composition comprising a trialkyl aluminum compound and titanium tetraiodide. In this process the trialkyl aluminum constituent of the catalyst system can be represented by the formula $R_3Al$, wherein R is an alkyl radical containing 1 to 6 carbon atoms. The alkyl groups can either be straight chained or branch chained and they can be the same or different. A particularly advantageous trialkyl aluminum compound for this purpose is triisobutyl aluminum. Preferably the catalyst system comprises 1.5 to 10 mols of trialkyl aluminum per mol of titanium tetraiodide.

Still another process for producing cis-polybutadiene rubber employs an aluminum alkyl chloride-cobalt chloride catalyst system. Typically, polymers produced using this catalyst system have a cis-1,4 content of over 94 percent.

However, regardless of the particular catalysts which may be used to produce butadiene polymers have an extremely high cis-1,4-content, the resultant polymers have essentially equivalent characteristics. For example, the cis-polybutadiene rubbers have good hysteresis properties and when used in the manufacture of tire treads, have wear resistance which is far superior to natural rubber and conventional GR-S (styrene-butadiene) rubber. However, the processing characteristics of these cis-polybutadiene rubbers leave much to be desired. The processibility of a rubber composition is particularly important in the manufacture of tire treads, since while it is imperative that tire treads have high resistance to wear, it is essential that they be manufactured in volume and, therefore, be produced from a rubber composition which extrudes easily through an orifice. Further, the extruded strip must have the shape of the orifice, a smooth shiny surface and sharp edges. Heretofore great difficulty has been encountered when attempting to extrude cis-polybutadiene rubber compositions.

Still another disadvantageous characteristic of cis-polybutadiene rubber is its behavior on a hot roll mill. A composition which has good milling properties, for instance styrene-butadiene rubber, forms a smooth and continuous band on the mills which is free from holes, glossy in appearance, and does not "bag" or fall off. Conventionally compounded cis-polybutadiene stocks, on the other hand, do not form a smooth continuous band.

In an effort to improve the processing characteristics of cis-polybutadiene rubber a number of peptizing agents and conventional rubber softeners has been studied, but none of these has been entirely satisfactory. In some cases the additives were found to be ineffective, and in other cases seriously degraded the properties of the composition, rendering it unsuitable for tire tread use.

The procedure currently used for improving the processing characteristics of cis-polybutadiene rubber involves blending the rubber with large amounts of natural or styrene-butadiene rubbers. Although this approach improves the processibility of cis-polybutadiene rubber, it leaves much to be desired, particularly when the blends comprise a major amount (i.e. over 50%) of cis-polybutadiene rubber, and further other important properties such as tire tread wear, in the case of natural rubber blends, and hysteresis, in the case of styrene-butadiene rubber blends, are deleteriously affected.

I have now discovered that a liquid polybutadiene having a certain critical microstructure, i.e. cis-, trans- and 1,2-content, and intrinsic viscosity, hereinafter more fully described, functions as a highly effective softener for cis-polybutadiene rubber, and also for blends of a major amount of cis-polybutadiene rubber and a lesser amount of another rubber, during processing operations, and covulcanizes with the rubber upon vulcanization to produce a composition having highly desirable physical properties, particularly a high resistance to wear.

The liquid polybutadiene used in the practice of this invention is an essentially linear polymer having an intrinsic viscosity in the range of from about 0.1 to about 1.2, more advantageously from 9.2 to 0.9, and a microstructure of from about 35 to about 55 percent cis-1,4-configuration, about 35 to about 60 percent trans-1,4-configuration and less than about 15 percent 1,2-configuration. More advantageously the 1,2-content of the polymer should be less than about 12 percent.

The microstructure of the liquid polymer, as referred to herein and in the appended claims, is determined by infrared analysis using the Richardson method reported in "Journal of Polymer Science," vol. 13, page 229 (1954).

The liquid linear polybutadiene defined above may be prepared, for example, by polymerizing butadiene in the presence of metallic lithium and/or lithium hydrocarbon catalyst in the substantial absence of oxygen. Suitable lithium hydrocarbon catalysts for this purpose are the alkyl, aryl, aralkyl or alkaryl lithium compounds or mixtures thereof. Also, as above-noted, lithium metal may be used alone as the catalyst or in combination with lithium hydrocarbon. Further, polylithium hydrocarbon compounds such as pentamethylene dilithium may be used effectively.

I have found that a particularly advantageous catalyst for polymerizing butadiene to the linear polymer herein contemplated is butyl lithium. The polymerization is advantageously carried out in an inert solvent, such as a low molecular weight parafinic hydrocarbon, and at a reaction temperature off rom 0° to 100° C. Desirably the reaction temperature should be kept under 80° C.

The intrinsic viscosity, $[\eta]$, of the liquid polybutadiene used in the practice of the invention is within the range of from about 0.1 to about 1.2, as previously noted, and is determined by extrapolating the plot of $\eta_{sp}/c$, where $\eta_{sp}$ is the specific viscosity and c. is the concentration of polymer, in grams per 100 cc. of the polymer, in benzene solvent, to zero concentration. Since the $\eta_{sp}/c$. is generally linear in the low concentration range, c. should be from about 0.25 to about 1.0 for the purpose of this determination.

The intrinsic viscosity of the polybutadiene produced by butyl lithium catalyzed polymerization is dependent on the ratio of butyl lithium to butadiene monomer employed, and increases as the ratio decreases. I have found that liquid polybutadiene suitable for use in the present invention may be produced by employing from about 0.1 to about 2.0 or more grams of the catalyst per 100 grams of monomer. Upon completion of the polymerization the catalyst may be destroyed using any of the known methods.

The optimum amount of liquid polybutadiene employed will vary depending on the Mooney viscosity of the rubber, the intrinsic viscosity of the liquid polybutadiene and the properties desired in the finished rubber compostion, but generally should be within the range of from about 10 percent to about 60 percent by weight of the rubber. When preparing a cis-polybutadiene rubber composition suitable for the manufacture of tire treads, it is desirable to use a rubber having a Mooney viscosity of from about 35 to about 55 (ML-4 at 212° F.) and about 10 to about 35 percent of the liquid polybutadiene by weight of the rubber. When used for this purpose the liquid polybutadiene should have an intrinsic viscosity of from about 0.2 to about 0.9.

Carbon blacks, particularly the grades known as furnace blacks, are widely used by the rubber industry as reinforcing fillters, and are conventionally added to the rubber composition in an amount up to as high as 200 parts per 100 parts of rubber, by weight. However, in most cases the preferred proportion of carbon black is from about 30 to about 90 parts per 100 parts of rubber. In the compounding of cis-polybutadiene rubber, or blends of over 50 percent cis-polybutadiene rubber with a lesser amount of natural rubber or styrene-butadiene rubber, with liquid polybutadiene, in accordance with the invention, the amount of carbon black which is advantageously added can be best expressed as a percentage, by weight, of the combined weight of the rubber and liquid polymer, and, so expressed, should be within the range from about 40 to about 85 percent.

Various other additives such as titanium dioxide, silica, zinc oxide, magnesium carbonate, etc. may be added according to the desires of the formulator to modify the properties of the composition.

Further, conventional rubber softening and plasticizing agents may be used in combination with the liquid polybutadiene to obtain additional advantages in processing characteristics and other desirable rubber properties. Thus, although the extrusion and milling characteristics are greately improved by compounding with liquid polybutadiene, in accordance with the invention, still further improvements in the processing characteristics, particularly mill handling, can be obtained by also employng a conventional processing oil in the composition.

Any one of a number of methods may be used to produce the rubber composition. For example, a masterbatch of the rubber and the liquid polybutadiene may be prepared and the carbon black incorporated in the masterbatch in a Banbury or the like. Another highly effective method comprises adding the carbon black and liquid polybutadiene with vigorous stirring to a solution of the cis-polybutadiene rubber in an organic solvent followed by desolventizing and drying operations. Still another advantageous method comprises adding an emulsion of the liquid polybutadiene and an aqueous slurry of carbon black to a pseudo-emulsion of the rubber solution in water and thereafter dewatering and desolventizing the mixture to produce a coagulum comprising the rubber having the liquid polybutadiene and carbon black dispersed therein. However, it is to be understood that the scope of the invention is not retricted to any particular method for incorporating the liquid polybutadiene in the rubber since other methods may be used. Generally, I have found that the most desirable properties are developed when the liquid polybutadiene is added to the rubber prior to or concurrently with, the carbon black, rather than after the addition of carbon black.

As previously noted, the microstructure, i.e. cis, trans and 1,2-content, of the liquid polybutadiene is critical and influences the processing characteristics and physical properties of the rubber composition, although I cannot advance any theory to explain this fact. However, I have found that when cis-polybutadiene rubber is compounded with liquid polybutadienes having microstructures different from the ones defined herein, little or no improvement in processing characteristics is obtained.

As a specific illustration of how a liquid polybutadiene suitable for use in the present invention may be prepared, butadiene was polymerized using an n-butyl-lithium catalyst in the following manner:

A. *Preparation of solvent.*—One gallon of commercial grade n-heptane was acid-washed by tumbling with 250 ml. of concentrated sulfuric acid overnight. 1100 cc. of the acid-washed heptane was poured through a 2 foot column of 4A molecular sieve blanketed with a nitrogen atmosphere and was then further purged by blowing nitrogen through it for three minutes. The heptane solvent was then blanketed with nitrogen until ready for use.

B. *Preparation of catalyst.*—10.45 cc. of a 15.04% solution of butyllithium in n-hexane solvent contained in a bottle provided with a self-sealing rubber stopper, was withdrawn by means of a nitrogen filled syringe which was previously dried for two hours in an oven at 125° C. and cooled in a desiccator. The withdrawn catalyst solution containing 1.05 g. of butyllithium was added to the heptane solvent, prepared by the above-described manner.

C. *Preparation of butadiene.*—A stainless steel bomb, previously dried in an oven at 125° C. for 2 hours and cooled with nitrogen, was pressured up with 20 lbs. pressure (p.s.i.g.) of gaseous instrument-grade butadiene (99.8% purity). The bomb was then immersed in a Dry Ice-acetone bath until 350 grams of the butadiene condensed.

D. *Polymerization.*—The heptane-catalyst solution was introduced into a dry evacuated one-gallon pressure autoclave through the blow pipe inlet by syphoning under a nitrogen blanket. The butadiene was charged into the autoclave under nitrogen pressure and the reactor was rapidly heated to 50° C. The polymerization reaction began immediately and was consummated to about 95% conversion within one hour. External cooling was necessary to keep the temperature of the highly exothermic reaction between 50° and 60° C.

At the completion of the reaction, a slight excess of methanol with respect to the butyllithium was added to the reaction mixture to destroy the catalyst by precipitaing lithium methoxide. The lithium methoxide was centrifuged out and the solvent removed leaving the polybutadiene oil.

The polybutadiene oil was found to have an intrinsic viscosity of 0.55 and a microstructure, determined by I.R. analysis, of 46 percent trans-1,4-structure, 45 percent cis-1,4-structure and 9 percent 1,2-structure.

The following specific examples serve to further illustrate the present invention, but it is to be understood that the invention is in no way limited thereo. Example I illusrates the effect of the liquid polybutadiene prepared as described in the above illustration on the properties of cis-1,4-polybutadiene rubber.

EXAMPLE I

In this operation cis-polybutadiene rubber having a cis-1,4-content of 95 percent, a trans-1,4-content of 2.5 percent, a 1,2-content of 2.5 percent and a Mooney viscosity at 212° F. (ML–4) of 40 was compounded with varying amounts of the liquid polybutadiene on a cold 6 x 12 mill.

As shown in Table 1, below, composition A was the control in this run and was not formulated with the liquid polybutadiene, while compositions B and C comprised 17.6 percent and 54 percent of polybutadiene oil, by weight of the rubber, respectively.

The extrusion characteristics of the compositions, prior to curing, were determined by means of a small extruder using a modified approach to the Garvey method. The edge of the extrudate was rated from 10 to 1 and the surface from A to E, both ratings ranging from good to bad. The compounding recipe and the results obtained are tabulated below in Table 1, the rubber properties having been determined by conventional methods after curing for 60 minutes at 290° F.

TABLE 1

|  | Parts by Weight | | |
| --- | --- | --- | --- |
|  | A | B | C |
| Recipe Employed: | | | |
| Cis-polybutadiene rubber | 100 | 85 | 65 |
| Carbon black | 50 | 50 | 50 |
| Liquid polybutadiene | | 15 | 35 |
| Zinc oxide | 5 | 5 | 5 |
| Stearic acid | 2 | 2 | 2 |
| Santocure [1] | 0.7 | 0.7 | 0.7 |
| Sulfur | 2.0 | 2.0 | 2.0 |
| Extrusion: Appearance rating | 3E | 7A | 10A |
| Rubber Physical Properties: | | | |
| L-300 (p.s.i.) | 1,435 | 1,340 | 1,135 |
| Tensile strength (p.s.i.) | 2,665 | 2,690 | 2,125 |
| Elongation (percent) | 435 | 475 | 465 |
| Shore hardness | 67 | 64 | 61 |

[1] n-Cyclohexyl-2-benzothiazole sulfinamide accelerator manufactured by Monsanto Chemical Company.

The foregoing results show that the cis-polybutadiene rubber compositions formulated with the liquid polybutadiene had excellent extrusion characteristics and acceptable physical properties, while the composition prepared without the liquid polybutadiene had extremely poor extrusion properties. Further, the balance of processing and physical properties possessed by composition B is extremely desirable for tire tread manufacture.

As previously noted, the microstructure of the liquid polybutadiene suitable for use in the present invention is of primary importance. The following example is illustrative of that fact.

EXAMPLE II

In this operation four cis-polybutadiene rubber compositions were prepared by identical procedure in accordance with the following recipe:

| Recipe employed: | Parts by weight |
| --- | --- |
| Cis-polybutadiene rubber | 80 |
| Liquid polybutadiene | 20 |
| Carbon black | 50 |
| Zinc oxide | 5 |
| Stearic acid | 2 |
| Santocure | 0.7 |
| Sulfur | 2.0 |

The compositions differed only in the type of polybutadiene oil employed. In Table 2 below, are tabulated the characteristics of the various liquid polybutadienes employed in this run, and also the extrusion characteristics of the rubber compositions, determined by the modified Garvey method, previously described, the proportions being by weight.

TABLE 2

| Composition | Microstructure | | | Intrinsic Viscosity | Appearance of Extrudate |
| --- | --- | --- | --- | --- | --- |
|  | Percent Cis | Percent Trans | Percent 1,2 | | |
| E | 44 | 47 | 9 | 0.62 | 9A |
| F | 10 | 70 | 20 | 0.61 | 2E |
| G | 20 | 15 | 65 | 0.56 | 2C |
| H | 93 | 3 | 4 | 0.65 | 4B |

As shown by the above tabulation, composition E, which comprised a polybutadiene oil of the type used in accordance with my invention, had extrusion characteristics far superior to the compositions compounded with other types of polybutadiene oils, namely, a high trans content poly butadiene (composition F), a high 1,2-content polybutadiene (composition G) and a high cis content polybutadiene (composition H).

The following example illustrates the wear performance of tire treads manufactured from a cis-polybutadiene rubber composition compounded with the liquid polybutadiene, in accordance with the invention.

EXAMPLE III

In this operation cis-polybutadiene rubber (defined in Example I) was compounded in accordance with the recipes set forth in Table 3. Tire treads of similar size and shape were manufactured from the compositions thus prepared and were applied to tires for road testing according to procedures well known in the industry. In this tire test program the control compositions, indicated below as composition I, was a blend of 90 parts of cis-polybutadiene rubber and 10 parts of natural rubber, by weight. This composition was arbitrarily given a tread wear index of 100. Composition J, a 50/50 blend of cis-polybutadiene rubber and natural rubber is representative of the current practice employed in the industry to prepare a cis-polybutadiene rubber composition which is processable and suitable for the manufacture of tire treads. Composition K is representative of the present invention and comprised a polybutadiene oil having an intrinsic viscosity of 0.27 and a cis-1,4-configuration of 47%, a trans-1,4-configuration of 44% and a 1,2-content of 9%.

The recipes, extrusion characteristics, road wear data and the physical properties of the stocks obtained by curing samples of each thereof at a temperature of 290° F. for the indicated time period, are reported in Table 3, below.

TABLE 3

|  | Parts by Weight | | |
| --- | --- | --- | --- |
|  | I | J | K |
| Recipe Employed: | | | |
| Cis-polybutadiene rubber | 90 | 50 | 85 |
| Natural rubber | 10 | 50 | |
| Liquid polybutadiene | | | 15 |
| Carbon black | 50 | 50 | 50 |
| Sundex 53 [1] | 10 | 10 | |
| Zinc oxide | 5 | 5 | 5 |
| Stearic acid | 2 | 2 | 2 |
| Santocure | 0.7 | 0.9 | 0.7 |
| Sulfur | 2.0 | 1.0 | 2.0 |
| Extrusion: Appearance rating | 4B | 7B | 8A |
| Rubber Properties: | | | |
| 20 min. L-300 (p.s.i.) | 620 | 1,070 | 940 |
| 20 min. Tensile strength (p.s.i.) | 2,320 | 3,660 | 2,480 |
| 60 min. L-300 | 930 | 1,340 | 1,310 |
| 60 min. Tensile strength | 2,920 | 3,540 | 2,570 |
| 60 min. Elongation (Percent) | 610 | 570 | 480 |
| 60 min. Shore hardness | 58 | 58 | 60 |
| Road Wear: Tread wear index | 100 | 88 | 114 |

[1] Moderately aromatic processing oil derived from petroleum and marketed by Sun Oil Company.

The foregoing results show that tire treads manufactured from the cis-polybutadiene rubber composition compounded with the liquid polybutadiene in accordance with my invention, wore 14% better than treads manufactured from a 90/10 blend of cis-polybutadiene rubber and natural rubber, and 26% better than treads manufactured from the rubber composition prepared according to current industry practice. Further, it will be noted that the composition containing the liquid polybutadiene had significantly better extrusion characteristics than did the control and also better than the 50/50 blend of cis-poly butadiene rubber and natural rubber.

I claim:
1. Method for improving the processing characteristics of a rubber selected from the group consisting of cis-polybutadiene rubber and blends of a major amount of cis-polybutadiene rubber and a lesser amount of a rubber selected from the group consisting of natural rubber and styrene-butadiene rubber, said cis-polybutadiene rub- ber having a cis-1,4-content greater than about 85% by weight and a Mooney viscosity (ML-4 @ 212° F.) of from about 35 to about 55, which comprises incorporating in said rubber a liquid linear polybutadiene having an intrinsic viscosity of from about 0.1 to about 1.2 and a microstructure of from about 35 to about 55 percent cis-1,4-configuration, from about 35 to about 60 percent trans-1,4-configuration and less than about 15 percent 1,2-configuration, and prepared by polymerizing butadiene in the absence of oxygen in an inert hydrocarbon solvent in the presence of a hydrocarbyllithium catalyst, the amount of said liquid polybutadiene being from about 10 to about 60 percent by weight of said rubber.

2. Method of claim 1, in which said rubber is cis-polybutadiene rubber.

3. Method of claim 1, in which said liquid linear polybutadiene has a 1,2-configuration of less than 12 percent.

4. Method of claim 1, in which said liquid linear polybutadiene has an intrinsic viscosity of from 0.2 to 0.9.

5. Method of claim 1, in which said amount of liquid polybutadiene is from 10 to 35 percent by weight of the rubber.

6. The process of claim 1 in which carbon black, in an amount within the range from about 40% to about 85% by weight of the combined weight of the rubber and the liquid polymer, is dispersed in the rubber after the incorporation of the liquid polymer in the rubber.

7. The process of claim 1 in which carbon black, in an amount within the range from about 40% to about 85% by weight of the combined weight of the rubber and the liquid polymer, is dispersed in the rubber concurrently with the incorporation of the liquid polymer therein.

8. A vulcanizable rubber composition comprising a rubber selected from the group consisting of cis-polybutadiene rubber and blends of a major amount of cis-polybutadiene rubber and a lesser amount of a rubber selected from the group consisting of natural rubber and styrene-butadiene rubber; said cis-polybutadiene rubber having a cis-1-4-content greater than about 85% by weight and a Mooney viscosity (ML-4 @ 212° F.) of from about 35 to about 55, a liquid linear polybutadiene having an intrinsic viscosity of from about 0.1 to about 1.2 and a microstructure of from about 35 to about 55 percent cis-1,4-configuration, from about 35 to about 60 percent trans-1,4-configuration and less than about 15 percent, 1,2-configuration, and prepared by polymerizing butadiene in the absence of oxygen in an inert hydrocarbon solvent in the presence of a hydrocarbyllithium catalyst, the amount of said liquid polybutadiene being from about 10 to about 60 percent by weight of said rubber; and carbon black in an amount of from about 40 to about 85 percent by weight of the combined weight of said rubber and said liquid polybutadiene.

9. Composition as in claim 8, in which rubber constituent is cis-polybutadiene.

10. Composition as in claim 8, in which the liquid linear polybutadiene has a 1,2-configuration of less than 12 percent.

11. Composition as in claim 10, in which the liquid linear polybutadiene has an intrinsic viscosity of from 0.2 to 0.9, and is present in an amount of from 10 to 35 percent by weight of said rubber.

12. Composition as in claim 11, in which the rubber constituent is cis-polybutadiene.

References Cited by the Examiner

UNITED STATES PATENTS

| 2,631,175 | 3/1953 | Crouch | 260—680 XR |
| 2,638,460 | 5/1953 | Crouch. | |
| 3,030,432 | 4/1962 | Warner | 260—680 |
| 3,105,856 | 10/1963 | Crouch | 260—680 |
| 3,159,587 | 12/1964 | Uraneck et al. | |

OTHER REFERENCES

Brown et al.: "Compounding Cis-Polybutadiene," Rubber World, November 1961, pages 70–75.

J. Hugh Macey: "Rubber Age," 96 (2), November 1963, pp. 221–232.

H. E. Railsback, W. T. Cooper, and N. A. Stumpe: "Rubber and Plastics Age," 39 (10), October 1958, pp. 867–869, 871, relied upon.

MORRIS LIEBMAN, *Primary Examiner.*

D. N. ERICKSON, J. E. CALLAGHAN,
*Assistant Examiners.*

UNITED STATES PATENT OFFICE
CERTIFICATE OF CORRECTION

Patent No. 3,281,389                              October 25, 1966

Stanley M. Hirshfield

It is hereby certified that error appears in the above numbered patent requiring correction and that the said Letters Patent should read as corrected below.

Column 2, line 29, for "from 9.2 to 0.9" read -- from 0.2 to 0.9 --; column 3, line 21, for "fillters" read -- fillers --; line 65, for "retricted" read -- restricted --.

Signed and sealed this 5th day of September 1967.

(SEAL)
Attest:

ERNEST W. SWIDER                           EDWARD J. BRENNER
Attesting Officer                             Commissioner of Patents